United States Patent [19]

Kock

[11] Patent Number: 4,949,677

[45] Date of Patent: Aug. 21, 1990

[54] AUTOMATIC MECHANISM FOR ANIMAL FEEDER

[76] Inventor: Randy R. Kock, R.R. 1, Box 276, Inwood, Iowa 51240

[21] Appl. No.: 295,343

[22] Filed: Jan. 10, 1989

[51] Int. Cl.⁵ .............................................. A01K 5/00
[52] U.S. Cl. ................................................... 119/56.1
[58] Field of Search ............... 119/51.11, 51.12, 52 R, 119/53, 53.5, 56 A, 56 R; 222/54, 56, 64, 650, 146.2, 146.5

[56] References Cited

U.S. PATENT DOCUMENTS

| | | | |
|---|---|---|---|
| 2,969,769 | 1/1961 | Paschall | 119/56 R |
| 3,504,654 | 4/1970 | Geerlings et al. | 119/56 R |
| 4,256,054 | 3/1981 | Hitchcock | 119/56 R X |
| 4,363,291 | 12/1982 | Harmsen | 119/56 R X |

Primary Examiner—Robert Peshock

[57] ABSTRACT

An automatic feeder for livestock including a device to meter and measure the amount of feed used. A thermal sensitive device is employed to provide a continuous supply of feed. The thermal sensing measures the heat insulation of feed in a container, and allows feed to drop from a bin into the container only when the layer of feed is so thin that the heat is radiated through the layer of feed.

5 Claims, 1 Drawing Sheet

AUTOMATIC MECHANISM FOR ANIMAL FEEDER

BACKGROUND AND SUMMARY OF THE INVENTION

This invention pertains to livestock feeders and more particularly to a feeder which is continuously supplied with feed, but in which the amount is controlled and measured so that the total amount of feed going though the feeder can always be known. The feed is delivered from a storage place in small amounts so that the feed available to the animals is always fresh.

Livestock feeders in which feed is constantly suppled to livestock from a storage container or bin have been available for some time. These feeders customarily are fed by gravity and the feeding compartment is kept constantly full. This type of feeder requires adjustments to provide adequate feed without causing an excess of feed to fall. Also, the only measure of feed supplied is determined by noting the reduction in the contents of the principal supply. If multiple feeders are fed from a single supply bin, there is no indication of how much goes to any particular feeder. Nor is there any inexpensive system for metering the feed.

In modern lifestock feeding operations, it is important that all livestock, especially including breeding stock, be fed efficiently. In order to do that, the feed must be attractive to the animal. One characteristic of attractive feed is freshness, and therefore, it is desirable to place only small amounts into a feed trough at any one time. Weather will not then affect the feed by damaging it or causing it to mold, because the small amounts will be consumed quickly enough that a new supply will be needed.

By my specific device I provide not only for automatic delivery of small metered amounts of feed when the eating area is emptied, but also use a device in which the feed is not delivered to the trough when an animal's head is in the trough.

Knowledge of the amount of feed being consumed may also be important particularly for lactating animals or those about to give birth. In those cases, animals may be confined to a small pen and small feeders may be used to deliver a metered amount of feed. By my device I provide for measuring the amount of feed so that the consumption by the animal may readily be computed.

DESCRIPTION

Figure 3:
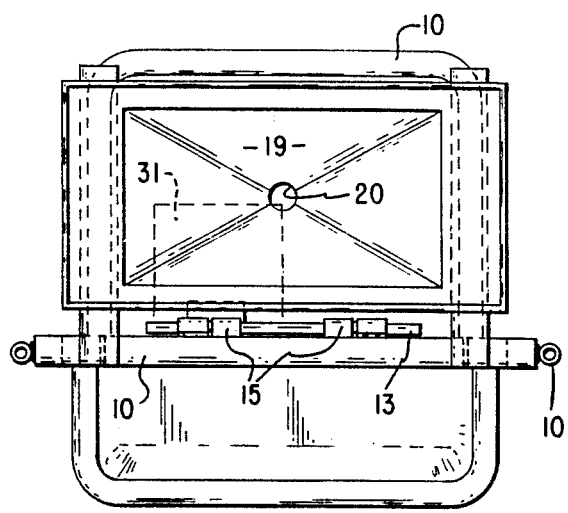
FIG. 3 is a view from line 3—3 of FIG. 1.
Figure 4:
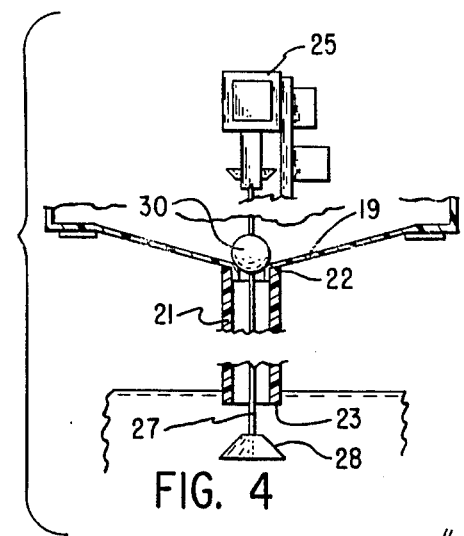
FIG. 4 is an elevational view of the metering mechanism apart from the feeder.
Figure 1:
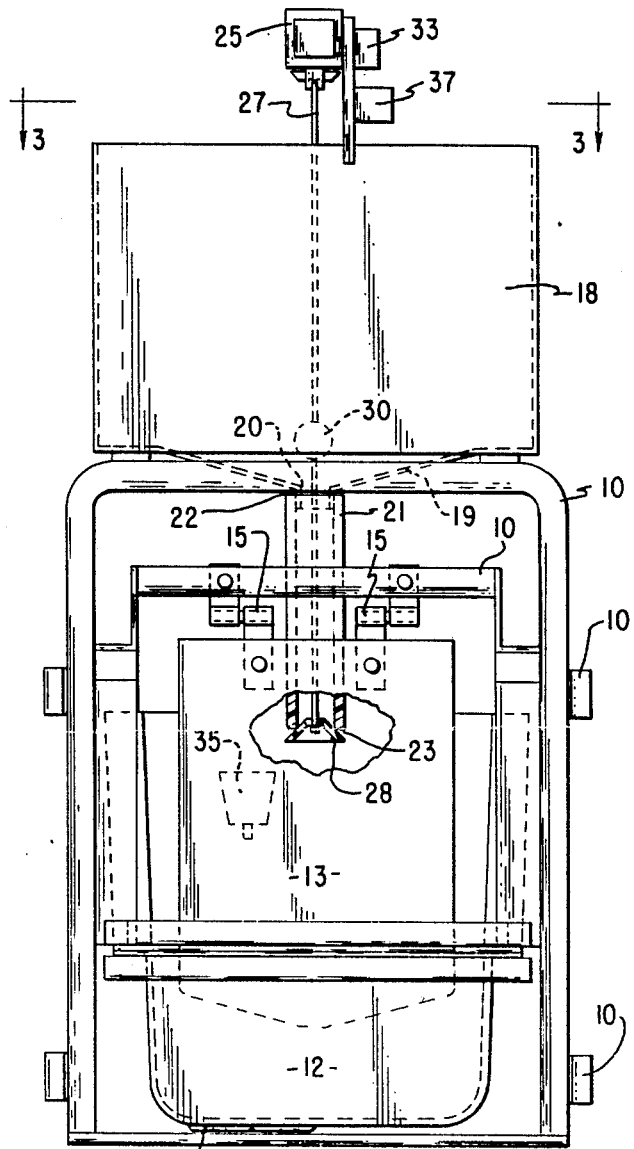
FIG. 1 is a front elevational view of the feeder of my invention.
Figure 2:
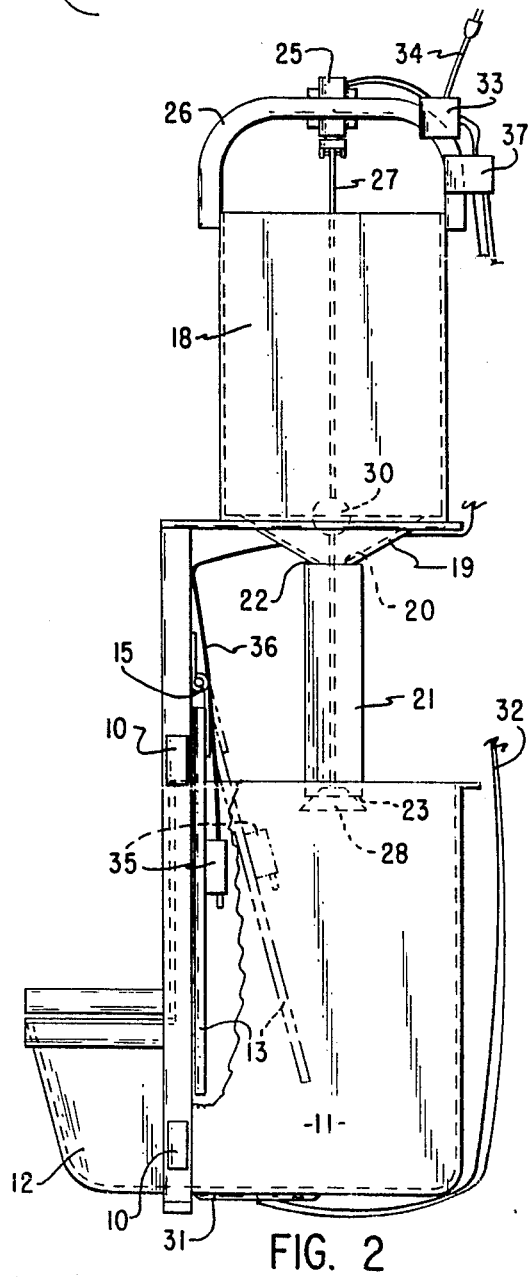
FIG. 2 is a side elevational view of the feeder of FIG. 1.

Briefly, my device comprises a livestock feeder particularly usable in single pen feeders, but in which the feed is metered out in small amounts which amounts can be counted so that the total amount of feed delivered can readily be calculated. By using small amounts, the feed available to the animal does not have time to become stale in the trough. A preferred infra-red actuation method forms a part of the invention.

More specifically, my invention is supported by a framework of bars 10 within which is enclosed a feeder including a container 11 and a trough 12. The trough 12 is in position such that livestock can eat feed which may be deposited in the container 11. In front of the container 11, I provide a door 13 hinged to the frame at the top 14 of the door. The door 13 is free swinging in the hinges 15 so that the nose of the animal could readily push the door out of the way and allow the animal to reach feed on the floor of the trough or container.

Above the container 11 I mount my automatic mechanism. The mechanism consists of a bin 18 having a tapered bottom 19 at the tip of which is formed an opening 20. A tube 21 leads from the bin 18 downward through the container 11. The tube 21 has an upper end 22 in communication with the opening 20 and a lower end 23. This tube is proportioned so that the volume of the interior of the tube acts as a meter to provide a measured or readily calculated amount of feed at each filling. This ability may be particularly important for commercial feeds, but is also useful with farm grown feed in determining the amount of feed consumed by a particular animal.

Control of the filling of the tube 21 from the bin 18 and discharge from the tube into the container 11 is accomplished by an electrical control which includes a solenoid 25 mounted on an arch 26 on the bin 18. The operating member of the solenoid is extended as a bar 27 running through the center of the bin 18 and through the tube 21. At its lower end, the bar 27 carries a conical shaped closure member 28 adapted to close the lower end of the tube 18. Also, near the upper end of the tube 18 I provide a bell shaped closure member 30. The member 30 is spaced on the bar 27 so that when the cone 28 closes the lower end 23 of the tube, the ball 30 is moved to a point sufficiently spaced from the upper end 22 that the feed will run from the bin into the tube. Then, when the solenoid allows the bar 27 to drop, the ball 30 is placed so that it closes the upper end 22 and the cone 28 opens the lower end, thus allowing one tube full of feed to drop into the container 11. It is recognized that there will be a very slight over-run while the bar is moving, and the device can be calibrated to take such over run into account if precise measurement is desired.

The solenoid 25 is electrically controlled by heat responsive means. A heating pad 31 is fixed to the bottom of the container 11, and is connected to a power source by a wire 32. A central switch box 33 may contain the manual switches desired to control all of the electrical devices. Also, some necessary wiring 34 is used to connect the device to the source of power.

A heat sensing device 35 is attached to the inner face of the door 13. This sensing device is relatively sensitive to heat from the pad 31 and is connected through the wire 36 to a relay box 37. Thus, when the sensor senses added heat, the relay box will cause the solenoid 25 to operate.

In actual use, the solenoid 25 normally holds the bar 27 up so that the cone 28 closes the lower end 23 of the tube 21, thus preventing flow of feed into the container 11. This normal condition is the state when the container 11 has a layer of feed covering the bottom so that there is considerable heat insulation, preventing heat of the pad 31 from operating the sensor 35.

When an animal consumes the feed, thus exposing the bottom of the container, the insulating is reduced or removed, thus allowing heat to be radiated to the sensor 35. Actuated by the heat, the sensor 35 signals the relay box 37 which then causes the solenoid 25 to drop the bar 27. This action allows one tube-full of feed to drop into the container. After a short delay, allowing the tube to empty, the relay will recycle to again raise the bar 27, closing the lower end 23 and opening the top 22 to refill the tube 21.

It will be apparent that the control circuit can be variously designed. For example, a control allowing time delayed recycling of the process could be provided so that there will be multiple operations of the solenoid until the insulation blocked the heat at a certain level dependent on the sensitivity of the sensor 35.

It should also be noted that in my preferred embodiment, the heat sensor 35 is insulated from the pad 31 when the door 13 is open. Thus, the sensor will not cause operation of the feed delivery mechanism while an animal is feeding. It is only when the animal has withdrawn its head—presumably because the container is empty—that the refilling action is triggered. This situation is desirable so that no animal—particularly a lactating female animal—is frightened by having feed dumped onto its snout suddenly.

It will also be apparent that any mechanical or electrical counter can be used to count the number cycles of operation of the solenoid. By use of such an electrical counter located in the relay box 37, the impulses could be fed into a computer to record for each of multiple feeders. The total feed consumed through each feeder will thus be known, thereby allowing a comparison of consumption among various pens of animals, or if only one adult animal had access to each feeder, comparison of each such animal to others would be possible.

Thus, I have provided a convenient feeder adapted to meter feed continuously so that fresh feed is always available to the livestock, and to provide the feeder with the ability to measure the feed efficiency of his livestock.

I claim as my invention:

1. A feeding system comprising container means, a bin mounted above said container means, metering means including feed carrying means adapted to convey feed by gravity from said bin to said container means, and control means for said metering means including a heat source beneath said container means and sensor means above said heat source whereby a reduction of insulation of said source by removal of feed from said container means will activate said control means to drop a metered amount of feed.

2. The system of claim 1 in which said container means includes a trough portion and a container portion, said heat source being located beneath said container portion, a door separating said portions, and said sensor being located on said door so that opening said door provides for insulation between said sensor and said heat source.

3. The system of claim 2 in which said door is hingedly connected to said container portion near the top edge of said door.

4. The system of claim 1 in which said metering means include a tube having an upper end at said bin and a lower end adapted to discharge into said container means, and said control means includes a solenoid mechanism operably connected to and controlled by said sensor means, said solenoid mechanism including a bar extending through said tube, and separate closure means mounted on said bar and adapted to alternately close said upper end and said lower end whereby a metered amount of feed will flow from said bin into said tube when said lower end is closed and from said tube into said container means when said upper end is closed.

5. The system of claim 4 in which counting means is included in said control means adapted to count the number of cycles operated by said control means.

* * * * *